United States Patent
Gruson

(10) Patent No.: US 6,543,204 B2
(45) Date of Patent: Apr. 8, 2003

(54) SCREW-TIGHTENING SPINDLE FITTED WITH A REMOVABLE CHUCK

(75) Inventor: Bertrand Gruson, Breville sur Mer (FR)

(73) Assignee: Serac Group, La Ferte Bernard (FR)

( * ) Notice: Subject to any disclaimer, the term of this patent is extended or adjusted under 35 U.S.C. 154(b) by 0 days.

(21) Appl. No.: 09/884,956

(22) Filed: Jun. 21, 2001

(65) Prior Publication Data

US 2001/0054273 A1 Dec. 27, 2001

(30) Foreign Application Priority Data

Jun. 21, 2000 (FR) ............................................. 00 07915

(51) Int. Cl.[7] .......................... B23B 31/00; B25G 3/00; F16D 1/00; B65B 7/28; B67B 1/06
(52) U.S. Cl. ......................... 53/331.5; 53/317; 53/351; 279/93; 403/315; 403/316; 403/349
(58) Field of Search ................................ 53/331.5, 317, 53/353, 351, 352; 279/104, 93, 103, 9.1; 403/348, 349, 166, 327, 315, 316, 352

(56) References Cited

U.S. PATENT DOCUMENTS

| | | | | |
|---|---|---|---|---|
| 1,866,863 A | * | 7/1932 | Richardson | 279/9.1 |
| 2,278,308 A | * | 3/1942 | Fairchild | 403/316 |
| 2,337,402 A | * | 12/1943 | Mills | 279/93 |
| 2,449,161 A | | 9/1948 | Craig et al. | |
| 5,327,697 A | * | 7/1994 | Kent | 53/331.5 |
| 5,417,031 A | | 5/1995 | Bankuty et al. | |
| 5,490,369 A | * | 2/1996 | Ellis et al. | 53/317 |
| 5,655,692 A | * | 8/1997 | Navin et al. | 403/348 |
| 5,687,552 A | * | 11/1997 | Barca | 53/331.5 |
| 5,868,533 A | * | 2/1999 | Fiala | 279/93 |
| 5,884,450 A | * | 3/1999 | Ronchi | 53/331.5 |
| 6,044,626 A | * | 4/2000 | Harper et al. | 53/317 |
| 6,254,303 B1 | * | 7/2001 | Falat et al. | 403/348 |
| 6,379,076 B1 | * | 4/2002 | Reinhold et al. | 403/348 |

FOREIGN PATENT DOCUMENTS

FR 2739048 3/1997

* cited by examiner

Primary Examiner—Anthony D. Stashick
(74) Attorney, Agent, or Firm—Birch, Stewart, Kolasch & Birch, LLP

(57) ABSTRACT

A screw-tightening spindle comprising a drive sleeve associated with a chuck comprising a cylindrical support member fitted with moving jaws, the cylindrical support member being provided externally with at least one stud extending radially outwards, the sleeve including at least one slot having a first segment opening out in a free edge of the sleeve and a second segment having an end portion forming an angle relative to the sleeve suitable for retaining the stud in the end portion of the slot when the stud is engaged therein, the sleeve being fitted with a ring having at least one stop extending radially inwards and received in the slot, the ring being mounted on the sleeve to slide between a locking position in which the stop extends in the first segment of the slot in register with the second segment, and an unlocking position in which the stop is retracted into a third segment of the slot.

5 Claims, 2 Drawing Sheets

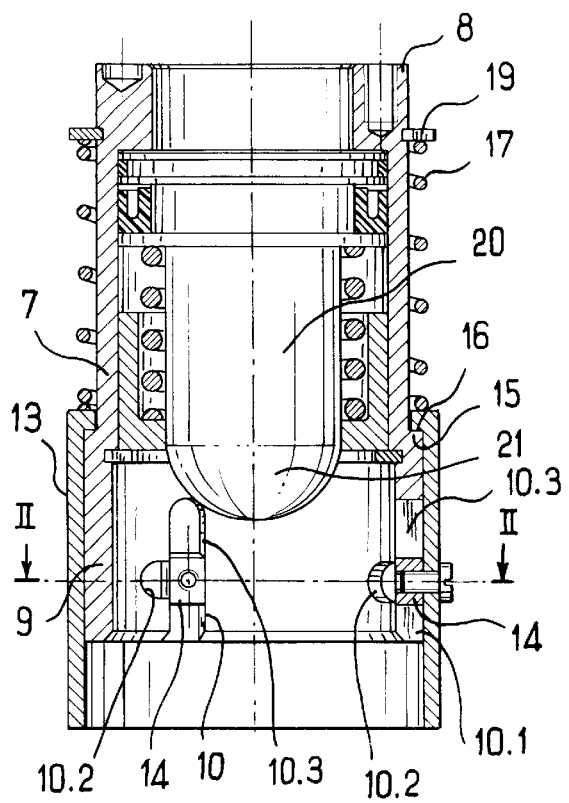
FIG_1
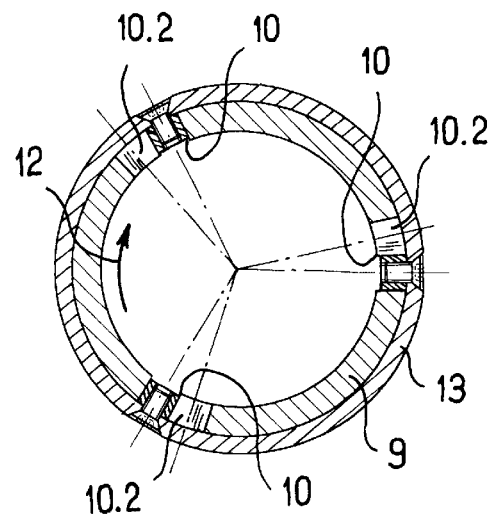
FIG_2
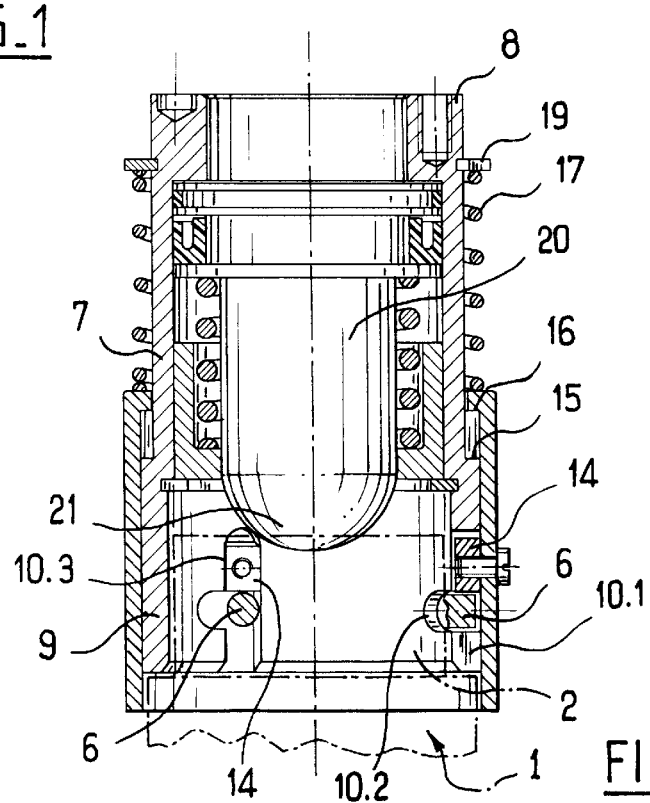
FIG_3

SCREW-TIGHTENING SPINDLE FITTED WITH A REMOVABLE CHUCK

The present invention relates to a screw-tightening spindle suitable for use in particular in a bottling plant for tightening caps onto the necks of receptacles.

BACKGROUND OF THE INVENTION

Screw-tightening spindles are known that comprise a drive socket having an end provided with a threaded collar onto which there is screwed a nut which is secured to a cap-holding chuck which comprises a cylindrical support member fitted with moving jaws. The combination of the threaded collar and the nut provides a removable coupling, thereby enabling the chuck to be replaced for maintenance purposes and more generally making it possible to have a set of interchangeable chucks that match different types of cap. In order to ensure that the jaw-support member is not removed accidentally, the screw pitch of the nut must be irreversible, i.e. the pitch must be short, requiring the nut to perform a plurality of tightening or loosening turns during installation or removal of the chuck. In addition, a plurality of screw-tightening spindles are generally grouped together in a common capping carousel, such that when changing the type of cap in use, chuck replacement requires the bottling plant to be stopped for a length of time that is proportional to the number of screw-tightening spindles mounted on the carousel. Such stoppage reduces productivity.

OBJECTS AND SUMMARY OF THE INVENTION

The invention provides a screw-tightening spindle comprising a drive sleeve associated with a chuck, the chuck comprising a cylindrical support member fitted with moving jaws and being provided on the outside with at least one stud extending radially outwards, the sleeve including at least one slot having a first segment opening out in a free edge of the sleeve and a second segment having an end portion forming an angle relative to the sleeve suitable for retaining the stud in the end portion of the slot when the stud is engaged therein, and the sleeve being fitted with a ring having at least one stop which extends radially inwards from the ring and is received in the slot, the ring being mounted on the sleeve to slide between a locking position in which the stop extends in the first segment of the slot in register with the second segment, and an unlocking position in which the stop is retracted into a third segment of the slot.

Thus, coupling is performed merely by axially displacing the cylindrical support member relative to the sleeve, followed by turning to bring the stud into the end portion of the slot. These two displacements can be performed in a single movement such that mounting the cylindrical support member on the sleeve and removing it therefrom can be performed much more quickly than with a nut while nevertheless ensuring positive locking of the jaw-support member relative to the sleeve.

Advantageously, the second segment of the slot extends from one side of the first segment of the slot such that when the sleeve is rotated, the stud of the cylindrical support member tends to be urged towards the end portion of the second segment of the slot. Thus, the risk of the sleeve and the cylindrical support member being accidentally separated is further reduced.

In a particular embodiment, the first slot segment extends substantially along an axial direction of the sleeve, and the second slot segment extends along a substantially circumferential direction of the sleeve and preferably, the third segment extends in line with the first segment. This makes the slot particularly simple to make.

Also advantageously, the spindle includes means for resiliently urging the ring into the locking position. The coupling is thus locked automatically without any direct manual action being taken on the ring.

BRIEF DESCRIPTION OF THE DRAWINGS

Other characteristics and advantages of the invention will appear on reading the following description of a particular non-limiting embodiment of the invention.

Reference is made to the accompanying drawings, in which:

FIG. 1 is a fragmentary longitudinal section view of a screw-tightening spindle of the invention;

FIG. 2 is a section view on line II—II of FIG. 1;

FIGS. 3 and 4 are views analogous to FIG. 1 in various stages of coupling the chuck to the driving sleeve of the screw-tightening spindle.

MORE DETAILED DESCRIPTION

The screw-tightening chuck of the invention is for coupling in conventional manner to a rotary drive shaft, e.g. installed in a carousel for closing receptacles that are provided with caps.

Figure 4:
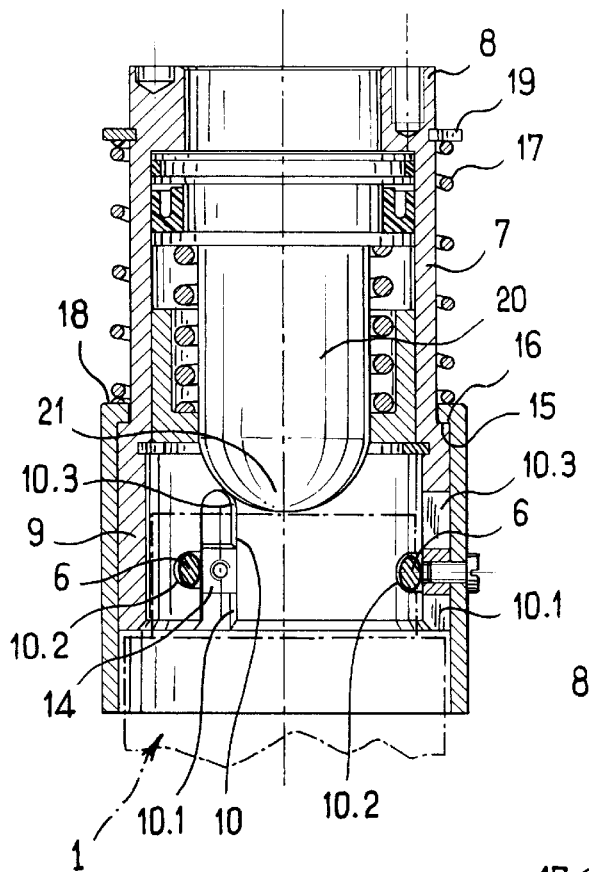
Figure 5:
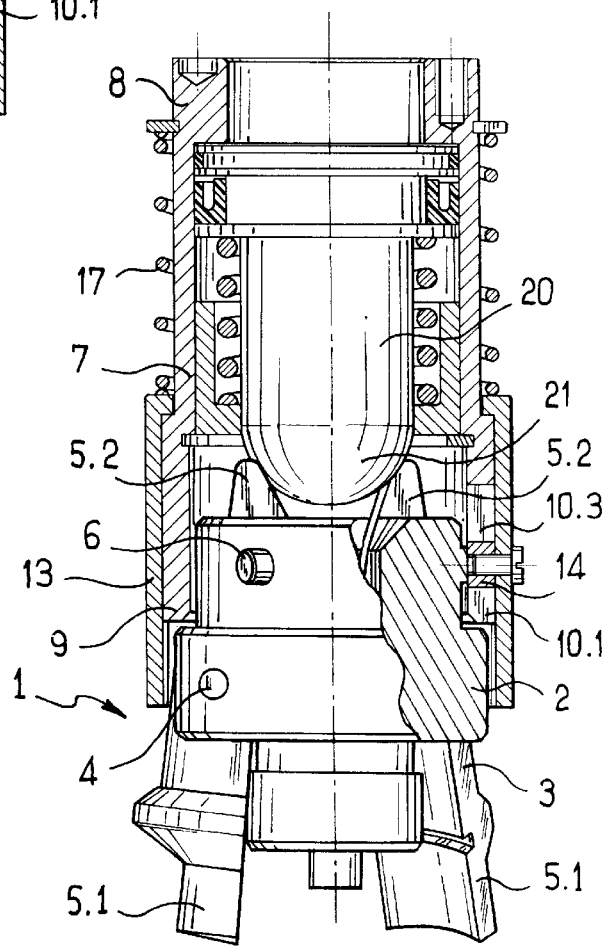
FIG. 5 is a view analogous to FIG. 1 showing the screw-tightening spindle of the invention after the chuck has been coupled thereto.

With reference to FIGS. 3 to 5, the screw-tightening spindle comprises a cap-holding chuck 1 which itself comprises a cylindrical support member 2 having jaws 3 mounted thereon to pivot about axes 4. Each jaw has a cap-holding end 5.1 and an opposite, lever-forming end 5.2 for actuating the jaw 3. Studs 6 project radially from the outer surface of the cylindrical support member 2. In this case, there are three such studs disposed at 120° intervals from one another. In order to ensure that FIGS. 3 and 4 are easy to read, the chuck 1 is shown for the most part in chain-doted lines with only its studs 6 being shown in section in these figures.

With reference also to FIGS. 1 and 3, the screw-tightening spindle also comprises a sleeve 7 having an end portion 8 for fixing to the rotary drive shaft and an opposite end portion 9 defining a cylindrical housing of circular section that is slightly greater than the cross-section of the cylindrical support member.

The end portion 9 of the sleeve 7 has slots 10 of width slightly greater than the cross-section of the studs 6. There are three such slots 10 in this case disposed at 120° intervals from one another.

Each slot 10 comprises a first segment 10.1 extending from a free edge 11 of the end portion 9 of the sleeve 7 in an axial direction of the sleeve 7, followed by a second segment 10.2 connected to the first segment 10.1 on its side that is opposite from the direction of rotation of the sleeve 7 as represented by arrow 12 in FIG. 2, i.e. the screw-tightening direction. The second segment 10.2 extends circumferentially relative to the sleeve 7 over a length that is slightly less than the diameter of the studs 6. The slot 10 also has a third segment 10.3 extending in line with the first segment 10.1 beyond the second segment 10.2.

The sleeve 7 is fitted with a locking ring 13 having three stops 14 which project radially towards the inside of the ring 13 and which are received in the slots 10. In this case there are three such stops 14 that are disposed at 120° intervals from one another.

The ring 13 is mounted on the sleeve 7 to slide axially between a locking position in which the ring has an inside shoulder 16 in abutment against an outside shoulder 15 of the sleeve 7 with the stops 14 extending in the first segments 10.1 of the slots 10 in register with the second segments 10.2 thereof, and an unlocking position in which the stops are retracted into the third segments 10.3 of the slots 10. The ring 13 is urged towards its locking position by resilient means, constituted in this case by a helical compression spring 17 which extends between an end face 18 of the ring 13 adjacent to the shoulder 15 and an external abutment 19 carried by the spindle 7.

When a chuck 1 is being mounted, the ring 13 is in its locking position (FIGS. 1 and 2), and the cylindrical support member 2 is inserted into the housing defined by the end portion 9 of the sleeve 7 so that the studs 6 engage in the first segments 10.1 of the slots 10, e.g. by a small amount of upwards thrust being exerted on the chuck 1 while simultaneously turning it until the studs 6 engage in the first segments 10.1 of the slots 10.

When the studs 6 come into abutment against the stops 14 they drive the ring 13 into its unlocking position against the thrust exerted by the spring 17 on the ring 13 (FIG. 3).

The operator then turns the ring 13 in the opposite direction to the screw-tightening direction 12 so that the studs 6 engage in the second segments 10.2 of the slots 10 as soon as the studs 6 face the second segments 10.2. The studs 6 then no longer act against the force of the spring 17 which returns the ring 13 into its locking position. The stops 14 are then again in register with the second segments 10.2 of the slots 10 and they prevent the studs 6 from escaping from the second segments 10.2 (FIGS. 4 and 5).

The screw-tightening spindle is then ready for use.

The jaws 3 are controlled in conventional manner by means of a piston 20 which is mounted in the sleeve 7 to slide between an extended position in which the piston 20 has an active end 21 inserted between the lever-forming ends 5.2 of the jaws 3 so as to move these ends apart from one another, thereby moving the opposite ends 5.1 towards one another, thus bringing the jaws into a closed position, and a retracted position in which the active end 21 of the piston is no longer in contact with the ends 5.2 of the jaws 3 so that the jaws 3 are returned to the open position by resilient means (not shown).

The chuck 1 is removed by bringing the ring 13 into its unlocking position, then causing the cylindrical support member 2 to turn relative to the sleeve 7 in the screw-tightening direction 12 so as to bring the studs 6 into the first segment 10.1 of the slots 10, and finally by pulling on the cylindrical support member 2 so as to extract it from the sleeve 7.

Naturally, the invention is not limited to the embodiment described and variant embodiments can be applied thereto without going beyond the scope of the invention as defined by the claims.

In particular, the number of studs and the number of slots can be modified, in particular as a function of the screw-tightening torque to be transmitted to the chuck.

Furthermore, the slots can be of other shapes. Thus, the third segments can be at an angle with the first segments, for example the first segments can be inclined relative to the longitudinal axis of the sleeve and the second segments can be at an angle relative to the circumferential direction of the sleeve. It can then be necessary to mount the ring in such a manner as to enable it to turn relative to the sleeve.

It is also possible to provide a fourth segment in each slot extending from the end of the second segment remove from its connection with the first segment, and forming an angle with the second segment for the purpose of locking the studs 6. The stops 14 then merely provide a safety function.

What is claimed is:

1. A screw-tightening spindle comprising a drive sleeve associated with a chuck comprising a cylindrical support member fitted with moving jaws, wherein the cylindrical support member is provided on its outside with at least one stud extending radially outwards, wherein the sleeve includes at least one slot having a first segment opening out in a free edge of the sleeve and a second segment having an end portion forming an angle relative to the sleeve suitable for retaining the stud in the end portion of the slot when the stud is engaged therein, and wherein the sleeve is fitted with a ring having at least one stop which extends radially inwards from the ring and is received in the slot, the ring being mounted on the sleeve to slide between a locking position in which the stop extends in the first segment of the slot in register with the second segment, and an unlocking position in which the stop is retracted into a third segment of the slot.

2. A screw-tightening spindle according to claim 1, wherein the second segment of the slot extends from one side of the first segment of the slot such that when the sleeve is rotated, the stud of the cylindrical support member tends to be urged towards the end portion of the second segment of the slot.

3. A screw-tightening spindle according to claim 1, wherein the first slot segment extends substantially along an axial direction of the sleeve, and wherein the second slot segment extends along a substantially circumferential direction of the sleeve.

4. A screw-tightening spindle according to claim 3, wherein the third segment extends in line with the first segment.

5. A screw-tightening spindle according to claim 1, including means for resiliently urging the ring into the locking position.

* * * * *